(12) United States Patent
Chang (10) Patent No.: US 8,243,163 B2
(45) Date of Patent: Aug. 14, 2012

(54) ADJUSTING AUTO WHITE BALANCE

(75) Inventor: Seung Ho Chang, Seoul (KR)

(73) Assignee: Core Logic, Inc., Seoul (KR)

( * ) Notice: Subject to any disclaimer, the term of this patent is extended or adjusted under 35 U.S.C. 154(b) by 317 days.

(21) Appl. No.: 12/660,032

(22) Filed: Feb. 19, 2010

(65) Prior Publication Data

US 2010/0214435 A1 Aug. 26, 2010

(30) Foreign Application Priority Data

Feb. 20, 2009 (KR) ........................ 10-2009-0014417

(51) Int. Cl.
*H04N 9/73* (2006.01)
*H04N 1/46* (2006.01)

(52) U.S. Cl. ..................................... 348/223.1; 358/516

(58) Field of Classification Search ............... 348/223.1, 348/244, 251; 358/516–518
See application file for complete search history.

(56) References Cited

U.S. PATENT DOCUMENTS

| | | | |
|---|---|---|---|
| 7,423,779 B2* | 9/2008 | Shi | 358/1.9 |
| 7,495,696 B2* | 2/2009 | Chikane et al. | 348/223.1 |
| 8,089,525 B2* | 1/2012 | Takayama | 348/222.1 |
| 2004/0246348 A1* | 12/2004 | Takeshita | 348/223.1 |
| 2008/0067683 A1* | 3/2008 | Cotte et al. | 257/762 |
| 2008/0309790 A1* | 12/2008 | Nishiwaki et al. | 348/223.1 |

FOREIGN PATENT DOCUMENTS

| | | |
|---|---|---|
| JP | 5191826 A | 7/1993 |
| JP | 2007-306320 A | 11/2007 |
| KR | 10-2006-0092658 A | 8/2006 |

* cited by examiner

*Primary Examiner* — Trung Diep

(74) *Attorney, Agent, or Firm* — The Nath Law Group; Jerald L. Meyer (57) ABSTRACT

Techniques, systems and apparatus are described for adjusting auto white balance (AWB). An AWB adjusting device includes a map setting unit to perform map-setting on a number of light-source boxes that is at least M times greater than a number of registers by performing map-switching. M is an integer greater than or equal to 2. The AWB adjusting device includes a pixel counting unit for counting a number of white pixels of a standard image contained in each light-source box with map-setting. The AWB adjusting device includes a light-source selection unit to select a light source based on a maximum light-source box selected from the number of light-source boxes having a greatest number of the white pixels. The AWB adjusting device includes a balance gain applying unit to calculate a red gain and a blue gain based on a mapping value of the maximum light-source box to adjust AWB.

20 Claims, 11 Drawing Sheets
(2 of 11 Drawing Sheet(s) Filed in Color)

ADJUSTING AUTO WHITE BALANCE

CLAIM OF PRIORITY

This application claims the benefit of Korean Patent Application No. 10-2009-0014417, filed on Feb. 20, 2009, in the Korean Intellectual Property Office, the disclosure of which is incorporated herein in its entirety by reference.

BACKGROUND

The present disclosure relates to digital image processing technologies.

As digital image processing apparatuses become popular and widely used, an auto white balance (AWB) function has been used to process digital image signals. The AWB function is performed on the color of a white subject by automatically adjusting red (R), green (G) and blue (B) gains so as to maintain a color temperature constant, that is, to obtain an electrical achromatic color in an area having high brightness or low brightness. The AWB function may be realized by various methods. For example, the AWB function may be realized by integrating image signals input through a charge-coupled device (CCD) over the whole image in which auto exposure (AE) is completely processed.

In a conventional method of adjusting AWB an optical image signal output from a subject via a lens is photoelectrically transformed through a CCD. The photoelectrically transformed optical image signal is stored on an image-by-image basis or a frame-by-frame basis in a memory such as dynamic random access memory (DRAM). The conventional method of adjusting AWB uses a technology of integrating input values of the CCD over the whole image to obtain an achromatic color, and a R/G and B/G coordinates system is used as a color coordinates system with respect to a color temperature. When the whole image is integrated to determine a color indicated by the color temperature, the brightest and darkest portions may saturate or distort the whole image, and thus the brightest and darkest portions are excluded.

A mosaic CCD exhibits a single color in units with a size of 2×2 pixels. Thus, image signals stored in a memory are integrated over the whole image in units with a size of 2×2 pixels. The brightest and darkest portions of the whole image are excluded by performing clipping thereon, and gains are calculated only on available portions. Then, the whole image is divided on a predetermined pixel-sized on a block-by-block basis, and light sources are detected for all blocks. An AWB process is performed on the detected light sources, and then the obtained AWB gains are applied to the whole image.

The given digital image processing apparatuses have used the same method of adjusting AWB throughout the world by using an AWB algorithm based on AWB parameters that are used when the apparatuses are mass-produced. That is, AWB performance has been optimized using a standard scene and a standard chart that are supported by each company, without consideration of information regarding a location being photographed and a time of photographing. However, color temperatures are different according to the location being photographed and the time of photographing. Thus, although the same subject is photographed, colors in the pictures are different in terms of color recognition according to the location being photographed and the time of photographing. When the given digital cameras perform photography at a location that differs from the standard scene and chart supported by each company, it is difficult to obtain the optimized AWB performance with respect to the given location and time.

SUMMARY

The present disclosure provides techniques, systems and apparatus for adjusting auto white balance (AWB) using an adaptable AWB adjustment obtained by preventing an unstable color change that occurs according to the surroundings, realizing accurate colors, separately performing white balance (WB) indoors and outdoors so as to reduce a relative error, and applying a gain according to the user and inventor's preference.

According to an aspect of the present disclosure, an auto white balance (AWB) adjusting device includes a map setting unit to perform map-setting on a number of light-source boxes that is at least M times greater than a number of registers by performing map-switching. M is an integer greater than or equal to 2. The AWB adjusting device includes a pixel counting unit to count a number of white pixels in a standard image contained in each light-source box with map-setting. The AWB adjusting device includes a light-source selection unit to select a light source based on a maximum light-source box selected from the number of light-source boxes having a greatest number of the white pixels. The AWB adjusting device includes a balance gain applying unit to calculate a red gain and a blue gain based on a mapping value of the maximum light-source box so as to adjust the AWB.

Implementations can optionally include one or more of the following limitations. The map setting unit may divide and set information regarding eight of the light-source boxes with respect to an $(n-1)^{th}$ frame and an $n^{th}$ frame by using eight of the registers. The pixel counting unit may count the number of the white pixels contained in the light-source boxes by using a temporary memory. The balance gain applying unit may apply to an $(n+1)^{th}$ frame the red gain and the blue gain which can be calculated based on the mapping value of the maximum light-source box. The red gain and the blue gain may be calculated by multiplying a red color value and a blue color value of the standard image by the mapping value of the maximum light-source box.

According to another aspect of the present disclosure, an image processing apparatus includes an image sensor to output an analog image signal of a subject. The image processing apparatus includes an image signal processor to generate a video image signal as an output by using a method that includes digitizing the analog image signal; performing map-setting on a number of light-source boxes that is at least M times greater than a number of registers by performing map-switching, wherein M is an integer greater than or equal to 2; selecting a light source based on a maximum light-source box selected from the number of light-source boxes having a greatest number of white pixels, and calculating a red gain and a blue gain based on a mapping value of the maximum light-source box so as to adjust the AWB. The image processing apparatus includes an output unit to receive the video image signal from the image signal processor and output the video image signal to a display device. The image processing apparatus includes a controller to control the image sensor, the image signal processor, and the output unit, wherein the AWB may be adjusted by the AWB adjusting device.

According to another aspect of the present disclosure, a method of adjusting auto white balance (AWB) includes performing map-setting on a number of light-source boxes that is at least M times greater than a number of registers by performing map-switching. M is an integer greater than or equal to 2. The method includes counting a number of white pixels in a standard image contained in each light-source box with map-setting performed. The method includes selecting a light source based on a maximum light-source box selected form the number of light-source boxes having a greatest number of the white pixels. The method includes applying a balance gain by calculating a red gain and a blue gain based on a mapping value of the maximum light-source box so as to adjust the AWB.

According to another aspect of the present disclosure, a method of adjusting auto white balance (AWB) includes performing map-setting on a number of light-source boxes that is at least M times greater than a number of registers by performing map-switching. M is an integer greater than or equal to 2. The method includes counting a number of white pixels in a standard image contained in each light-source box with map-setting performed. The method includes selecting a light source based on a maximum light-source box selected from the number of light-source boxes having a greatest number of the white pixels. The method includes determining whether a given location is outdoors or indoors in order to correct misdetection of the light source. The method includes applying a balance gain by calculating a red gain and a blue gain based on a mapping value of the maximum light-source box so as to adjust AWB.

Implementations can optionally include one or more of the following features. When the given location is determined to be outdoors or the light source is determined the Daylight, the AWB may be adjusted using a predefined method of adjusting the red gain or the blue gain within a corresponding AWB range. When the given location is determined to be indoors and the light source is determined to not be the Daylight, the AWB may be adjusted using a non-predefined method of calculating the red gain and the blue gain based on a mapping value of the maximum light-source box.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other features and advantages of the present disclosure will become more apparent by describing in detail exemplary embodiments thereof with reference to the attached drawings in which.

DETAILED DESCRIPTION

Techniques, systems and apparatus are described for adjusting auto white balance.

Figure 1:
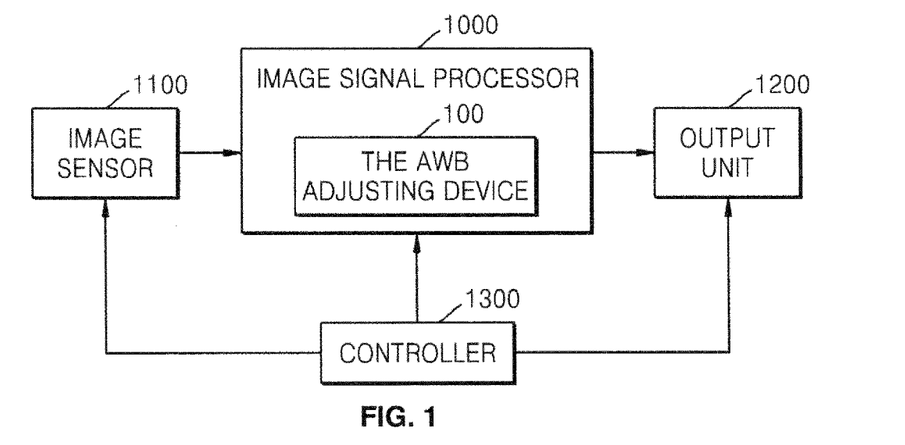
FIG. 1 is a block diagram of an image processing apparatus according to an embodiment of the present disclosure.

FIG. 1 is a block diagram of an image processing apparatus according to an embodiment of the present disclosure. The image processing apparatus includes an image sensor 1100, an image signal processor 1000, an output unit 1200 and a controller 1300.

The image sensor 1100 captures an image of a subject, and outputs an analog image signal corresponding to the captured image of the subject. The image signal processor 1000 can include an analog/digital (A/D) converter (not shown), a gamma corrector (not shown) and an auto white balance (AWB) adjusting device 100. The image signal processor 1000 generates a video image signal for outputting the captured image by digitizing the analog image signal, correcting signal distortion and adjusting AWB according to a light source. The AWB adjusting device 100 included in the image signal processor 1000 may perform an adaptable AWB adjustment by preventing an unstable color change that occurs according to the surroundings, by realizing accurate colors, and by separately performing white balance (WB) indoors and outdoors so as to reduce a relative error. The AWB adjusting device 100 is described further with reference to FIGS. 2A and 2B below.

The output unit 1200 receives the video image signal from the image signal processor 1000, and outputs the video image signal to a display device (not shown). The controller 1300 controls overall operations of the image sensor 1100, the image signal processor 1000 and the output unit 1200. Although not illustrated in FIG. 1, the image processing apparatus may include a storage device for storing various pieces of data required for processing image signals.

Because the AWB adjusting device 100 uses a maximum of sixteen light-source boxes by performing map-switching so as to adaptively adjust AWB according to surroundings, a deviation between light sources may be reduced so as to prevent an unstable color change (i.e., shaking of color change) of an image, and thus the quality of the image sensor 1100 may be improved. In addition, light-source boxes that are as small as possible can be arranged as closely together as possible so as to have the optical color placed at a portion of the display where a light-source box exists, thereby realizing accurate colors.

Figure 2A:
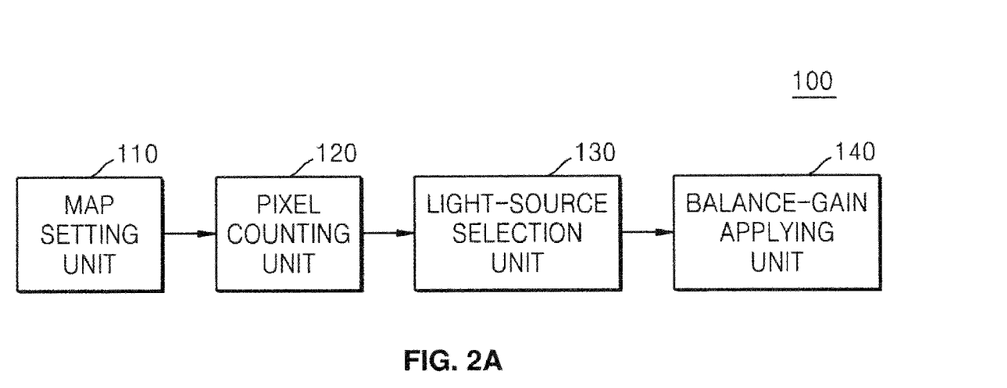
FIGS. 2A and 2B are block diagrams of an auto white balance (AWB) adjusting device of the image processing apparatus of FIG. 1, according to embodiments of the present disclosure.

FIGS. 2A and 2B are block diagrams showing exemplary implementations of the AWB adjusting device 100 of the image processing apparatus of FIG. 1 according to embodiments of the present disclosure. Ref erring to FIG. 2A, the AWB adjusting device 100 includes a map setting unit 110, a pixel counting unit 120, a light-source selection unit 130 and a balance-gain applying unit 140. The map setting unit 110 performs map-setting by performing map-switching on light-source boxes using eight registers. Conventionally, map-setting is performed on eight light source boxes with respect to a single frame by using eight registers, and afterwards, a light source is tracked with respect to each frame on which the map-setting is performed. However, according to the present embodiment, a maximum of a number of light-source boxes that is at least M times a number of registers are used with M being an integer greater than or equal to 2. For example, a maximum of eight light-source boxes can be mapped with respect to a first frame by using eight registers; a maximum of eight light-source boxes can be mapped with respect to a second frame just after the first frame; and the sixteen light-source boxes of the first and second frames can be used together by performing map-switching. Thus, in one example, light sources may be tracked after using a maximum number of light-source boxes that is twice the number of the assigned registers, e.g., a maximum of sixteen light-source boxes. The map-setting is described further with reference to FIG. 3 below. According to the present embodiment, the map-setting can be performed on a number of light-source boxes that is at least twice (e.g., 3-times, 4-times, etc.) the number of the registers.

The pixel counting unit 120 counts the number of white pixels in a standard image in each light-source box on which the map-setting is performed, stores the counted number in a temporary storage device, and searches for a maximum light-source box having the greatest number of white pixels. In addition, the pixel counting unit 120 sorts the light-source boxes according to the number of white pixels. White pixels are extracted or identified from the standard image using multiple gray charts or multiple Macbeth charts that are photographed indoors or outdoors. The standard image may include color information based on a sufficient number of white pixels from each patch of the gray chart, and the white pixels of the standard image may be counted by counting the pixels of a gray patch in the Macbeth chart.

In order to accurately count the number of white pixels in the standard image, the map-setting may be performed on an image on which only lens-shading correction is performed. The lens shading correction is used to remove the case where the brightness of an edge portion of a lens is darker than that of a central portion of the lens according to the size of the lens.

The light-source selection unit 130 selects a corresponding light source according to the maximum light-source box having the greatest number of white pixels, which are counted by the pixel counting unit 120. The map setting unit 110 may perform the map-setting on the light-source boxes based on test light-sources that correspond to Horizon, A, TL84, CWF, Fluorescent, and Daylight, etc., each having a color temperature defined in a light booth. Thus, when the maximum light-source box having the greatest number of white pixels is determined, a test light-source corresponding to the maximum light-source box may be selected as a light source of the given image.

After the light-source selection unit 130 selects the light source of the given image, the balance gain applying unit 140 calculates a red gain (R_gain) and a blue gain (B_gain), based on a mapping value of the maximum light-source box. The calculated red gain (R_gain) and blue gain (B_gain) are red and blue gains of a new image obtained by correcting color values of red and blue pixels in the standard image by using the mapping value of the maximum light-source box. This correction is performed by moving the white pixels contained in a corresponding light-source box to a central portion of a color coordinates system regarding a color temperature and using R/G and B/G as axes, which are described further with reference to FIGS. 5A through 6B.

A red gain or a blue gain may be calculated based on a concept: "R and G color values of standard image*mapping value=R and B gains of corrected image". This concept may be expressed using Equation (1). Equation (1) may be generalized as Equation (2).

$R\_gain = G\text{sumreg}[\text{BoxMax}]/R\text{sumreg}[\text{BoxMax}]*1024$ $B\_gain = G\text{sumreg}[\text{BoxMax}]/B\text{sumreg}[\text{BoxMax}]*1024$ (1)

$R\_gain = 128/(R\text{sumreg}[\text{BoxMax}]/G\text{sumreg}[\text{BoxMax}])*1024$ $B\_gain = 128/(B\text{sumreg}[\text{BoxMax}]/G\text{sumreg}[\text{BoxMax}])*1024$ (2)

In Equations (1) and (2), Gsumreg[BoxMax] is the sum of green color values of the maximum light-source box, Rsumreg[BoxMax] is the sum of red color values of the maximum light-source box, and Bsumreg[BoxMax] is the sum of blue color values of the maximum light-source box. '1024' is a theoretical 10 bit mapping value, and '128' is an intermediate value of 0 to 256 color spaces. Thus, when the red and blue gains are adjusted according to Equation (2), white pixels contained in a corresponding light-source box are moved to a central portion of a color coordinate system using R/G and B/G as axes. By moving the white pixels to the central portion of the color coordinates system, white balance is accurately adjusted with respect to the given light source.

Figure 2B:
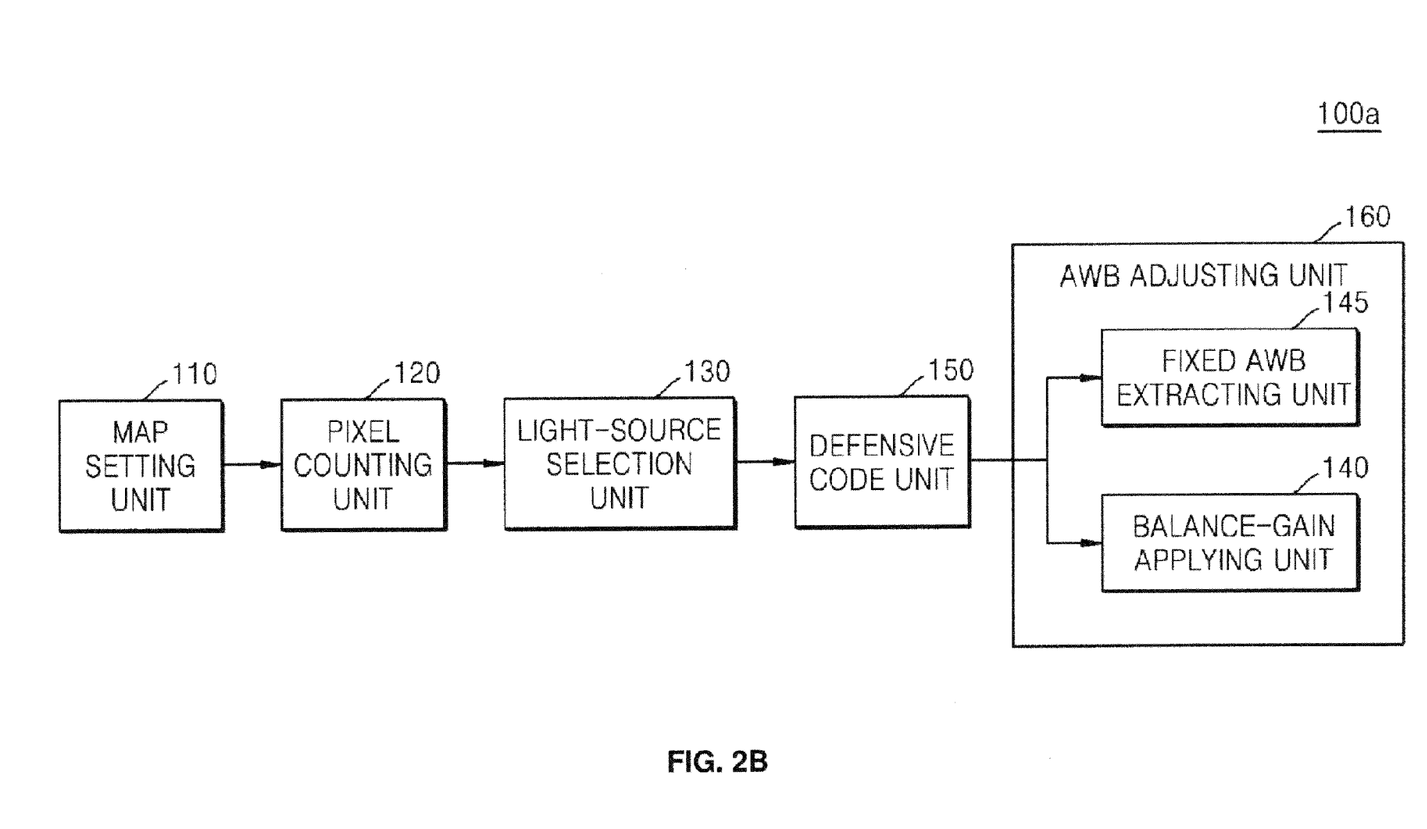

Referring to FIG. 2B, the AWB adjusting device 100a has a similar configuration as the AWB adjusting device 100 of FIG. 2A. However, the AWB adjusting device 100a may further include a defensive code unit 150 for correcting misdetection of a light source at the end of the light-source selection unit 130. Also, rather than the balance gain applying unit 140 of FIG. 2A, the AWB adjusting device 100a may include an AWB adjusting unit 160 that selectively uses a balance gain applying unit 140 and a fixed AWB extracting unit 145.

The defensive code unit 150 determines or identifies whether the given location is indoors or outdoors by comparing an auto exposure (AE) time, that is, a shutter time interval (int_time), with a predetermined threshold value. The AE time is shorter for outdoors than indoors, and thus when a given AE time is identified as being shorter than the predetermined threshold value, is the defensive code unit 150 determines that the given location is outdoors. When the AE time is identified as being longer than the predetermined threshold value, is the defensive code unit 150 determines that the given location is indoors. For example, a threshold value can be set as a period of time corresponding to 200 horizontal synchronization (Hsync) lines. For this example threshold value, when the AE time is identified as being shorter than 200 Hsync lines, the defensive code unit 150 determines that the given location is outdoors. In addition, when the AE time is identified as being longer than or equal to 200 Hsync lines, the defensive code unit 150 determines that the given location is indoors.

The defensive code unit 150 determines whether a light source is daylight even when the given location is determined to be indoors. When the defensive code unit 150 determines that the light source is daylight, AWB adjustment for outdoors is used even if the given location is determined to be indoors. The defensive code unit 150 can determine whether the light source is daylight by determining whether the maximum light-source box selected by the light-source selection unit 130 is a light-source box located at the lowermost portion of a color coordinates system.

After the defensive code unit 150 determines the given location, the AWB adjusting unit 160 adjusts the AWB according to the determined given location. The AWB adjusting unit 160 includes the balance gain applying unit 140 and the fixed AWB extracting unit 145. When the defensive code unit 150 determines that the given location is indoors, and that the light source is not daylight, the balance gain applying unit 140 calculates the red and blue gains according to the mapping value of the maximum light-source box so as to adjust AWB, as described with reference to FIG. 2A. When the defensive code unit 150 determines that the given location is outdoors, or that the light source is daylight, the AWB is adjusted through the fixed AWB extracting unit 145 by manually adjusting the red gain or the blue gain within a predetermined range of AWB, a fixed value obtained according to a light source.

For reference, the given location is divided into indoors and outdoors to accommodate a user's preference. When the user desires to make an overall cool image by reinforcing a blue gain value to an accurate AWB value that has been already obtained, or when the user desires to emphasize the people in the image by reinforcing a red gain value, the corresponding gain (red or blue) may be manually adjusted and used. In this case, the red or blue gain value may be manually reinforced within a range close to a fixed AWB value obtained with respect to a target image, based on a fixed AWB value that has been accurately calculated in an outdoors test. This method can be represented as a predefined method.

With regard to the indoors, the balance gain applying unit 140 of the AWB adjusting device 100a may use a method of adjusting the AWB by calculating red and blue gains according to Equation (2). This method can be represented as a non-predefined method.

Although in reality, the given location is indoors, the defensive code unit 150 can determine that the given location is outdoors when a large amount of sunlight enters, such as adjacent to a window. For such indoor locations identified as outdoors, the predefined method may be used. On the other hand, although in reality the given location is outdoors, the defensive code unit 150 can determine that the given location is indoors and use the non-predefined method for a location where the brightness is insufficient or the amount of sunlight is insufficient. A method that selectively chooses the predefined method or the non-predefined method based on the characteristics of the surroundings can be designated as a partial-predefined method.

Based on the above designations, an example operation of the AWB adjusting unit 160 is described. When the defensive code unit 150 determines that the given location is outdoors, or that a light source is daylight, the AWB is adjusted using the predefined method. When the defensive code unit 150 determines that the given location is indoors, or that a light source is not daylight, the AWB is adjusted using the non-predefined method. The AWB adjusting device 100a determines the type of the surroundings through the defensive code unit 150, and selectively chooses the predefined method or the non-predefined method based on the determination result. Thus, the AWB adjusting device 100a uses the partial-predefined method. In addition, when using the partial-predefined method, the predefined method and the non-predefined method may be appropriately selected without correctly identifying the surroundings into indoors and outdoors, as described above.

Because the AWB adjusting device 100a uses a maximum of sixteen light-source boxes by performing map-switching, a deviation between light sources may be reduced so as to prevent an unstable color change in an image, and thus the quality of the image sensor 1100 may be improved. In addition, the light-source boxes that are as small as possible can be arranged as close to each other as possible to provide enough space for the optical color to be placed at a portion of the display where a light-source box does not exist, thereby realizing accurate colors.

In addition, because the AWB adjusting device 100a adjusts the AWB by using the predefined method or the non-predefined method based on the type of surroundings through the defensive code unit 150, this can avoid misdetection of light sources under a multi-light source environment such as a location where sunlight and artificial-light exist together. Thus, an adaptable AWB may be performed by maximizing the balance color sense with respect to the surroundings, and by applying a gain to the color sensor according to the user and designer's preference.

Figure 3:
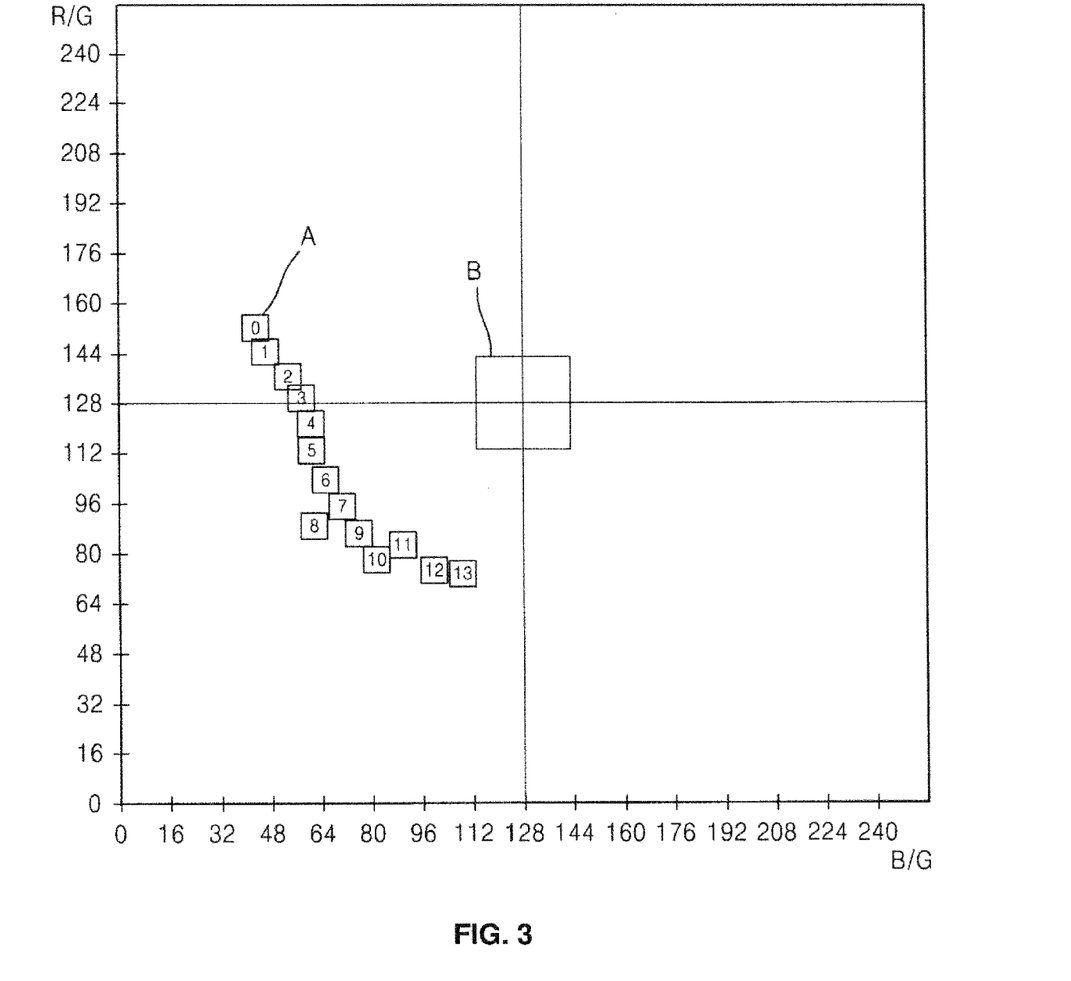
FIG. 3 is a graph for showing a case where light-source boxes are arranged in a color coordinates system, according to an embodiment of the present disclosure.

FIG. 3 is a graph for showing an exemplary case where light-source boxes are arranged in a color coordinate system, according to an embodiment of the present disclosure. In FIG. 3, the x-axis indicates relative color coordinates (B/G) of blue, and the y-axis indicates relative color coordinates (R/G) of red.

An AWB adjusting device according to the present embodiment performs map-setting on a number of light-source boxes that is twice the number of registers with respect to two frames by performing map-switching in the map setting unit 110. The map-setting may be performed by filling a screen with a gray chart as much as possible, and sequentially arranging a maximum of sixteen light-source boxes according to test light-sources that corresponds to Horizon, A, TL84, CWF, Fluorescent, and Daylight, etc., by using map-switching, when only a lens shading function is activated in a light booth.

Each light-source box 'A' can have a 10×10 size in the color coordinate system, and light-source boxes are sequentially arranged so as not to generate an empty space between test light sources. When determined that spaces between corresponding light sources are sufficiently filled with predetermined light-source boxes that are sequentially arranged, the remaining light-source boxes do not have to be used. Conventionally, since eight registers are used, only a maximum of eight light-source boxes are set. Thus, spaces between test light sources are insufficiently filled. If the maximum number of white pixels exists between light-source boxes, red and blue gains are calculated through a mapping value of a nearby light-source box, and thus an accurate balance gain is not obtained.

However, according to the present embodiment, because a maximum of sixteen light-source boxes are used through a map-switching method, light-source boxes may be arranged so as to fill spaces between test light sources. As described above, all of the maximum of sixteen light-source boxes do not have to be used. For example, when determined that spaces between corresponding light sources are sufficiently filled with predetermined light-source boxes, the remaining light-source boxes may be not used. In FIG. 3, the thirteen light-source boxes 'A' are arranged. In addition, the remaining light-source boxes may be used to perform low-illuminance correction and skin-tone correction. For example, ten light-source boxes may be used to perform mapping or map setting, and the remaining six light-source boxes may be used to perform low-illuminance correction and skin-tone correction. In FIG. 3, a central box 'B' is a color coordinate region where white pixels of the given light source have to exist, and is a region to which white pixels contained in the maximum light-source boxes have to be moved by applying a balance gain, that is, by applying red gain and blue gain correction.

Figure 4:
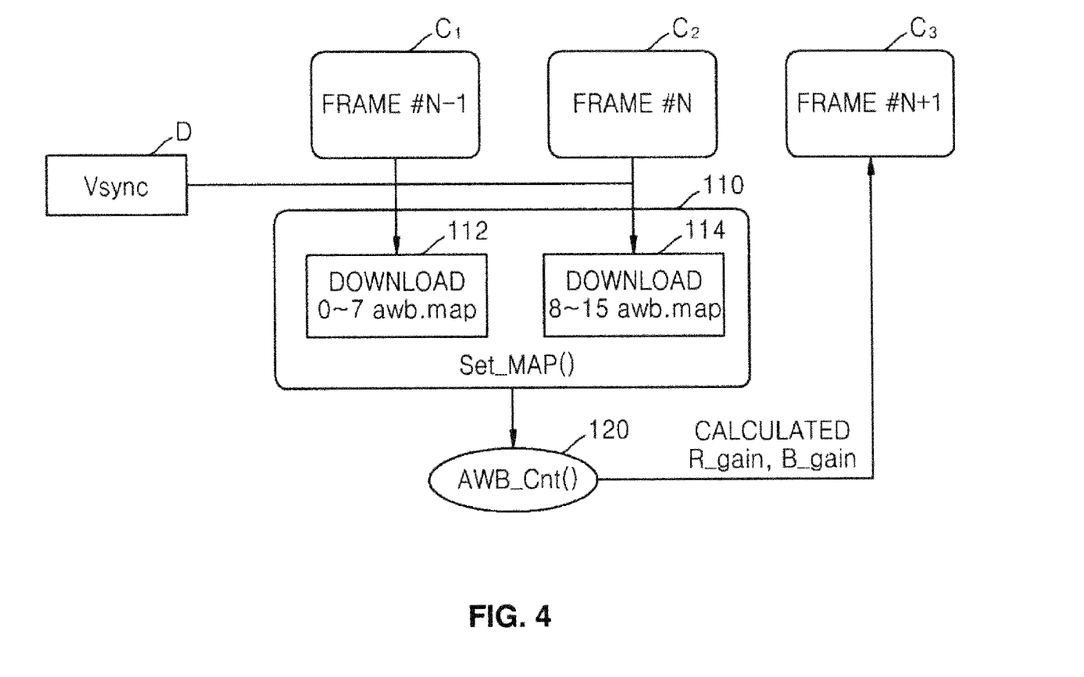
FIG. 4 is a conceptual view for explaining operations of a map setting unit and a pixel counting unit of the AWB adjusting device, according to an embodiment of the present disclosure.

FIG. 4 is a conceptual view for explaining example operations of the map setting unit 110 and the pixel counting unit 120 of the AWB adjusting device 100 or 100a, according to an embodiment of the present disclosure. Conventionally, map-setting is performed on eight light source boxes with respect to a single frame by using eight registers. That is, location information regarding each light-source box is set on the eight registers. However, according to the present embodiment, as shown in FIG. 4, the map setting unit 110 sets eight light-source boxes with respect to a $(N-1)_{th}$ frame (FRAME #N-1) $C_1$ by using eight registers, and the pixel counting unit 120 counts the number of white pixels with respect to the light-source boxes through a software calculation and stores the counted number of white pixels in a temporary storage device (not shown). Then, the map setting unit 110 sets another eight light-source boxes with respect to an $N_{th}$ frame (FRAME #N) $C_2$ by using the eight registers, and the pixel counting unit 120 counts the number of white pixels with respect to the additional eight light-source boxes and stores the counted number of white pixels.

The map setting unit 110 may perform map-setting on a maximum of sixteen light-source boxes through the above-described map-switching, and the pixel counting unit 120 may count the number of white pixels with respect to the maximum of sixteen light-source boxes. In addition, the pixel counting unit 120 may identify the maximum light-source box having the greatest number of white pixels, based on the number of white pixels counted for each light-source box, which is stored in the temporary storage device. Moreover, the pixel counting unit 120 can sort the light-source boxes according to the number of white pixels. For example, the light-source boxes can be sorted in an ascending or descending order based on the number of white pixels included in each light-source box. Because a location of light-source boxes set in the FRAME #N-1 $C_1$ and a location of light-source boxes set in the FRAME #N are different, vertical-synchronization (Vsync: D) is matched between frames.

When the maximum light-source box (e.g., one having the most number of white pixels) is identified by the pixel counting unit 120, red and blue gains are calculated based on a mapping value of the identified maximum light-source box, according to Equation (2). The calculated red and blue gains are applied to a $(N+1)_{th}$ frame (FRAME #N+1) $C_3$. Then, the $(N+1)_{th}$ frame (FRAME #N+1) $C_3$ is used in subsequent map-setting, and the operations of the map setting unit 110 and the pixel counting unit 120 proceed in the manner that calculated red and blue gains are applied to an $(N+2)_{th}$ frame (not shown).

Conventionally, these map-setting and pixel counting operations depend on an initially set number of registers that are assigned to map-setting. However, according to the present embodiment, a maximum number of light-source boxes (e.g., sixteen) that is at least twice the number of assigned registers may be used based on a map-switching method, as needed. In addition, map-setting may be performed on even greater number (e.g., triple or more) of light-source boxes than the number of registers by using the map-switching method, as needed. For example, map-setting may be performed on 24, 32, 40, 48, etc. light-source, boxes.

Figure 5A:
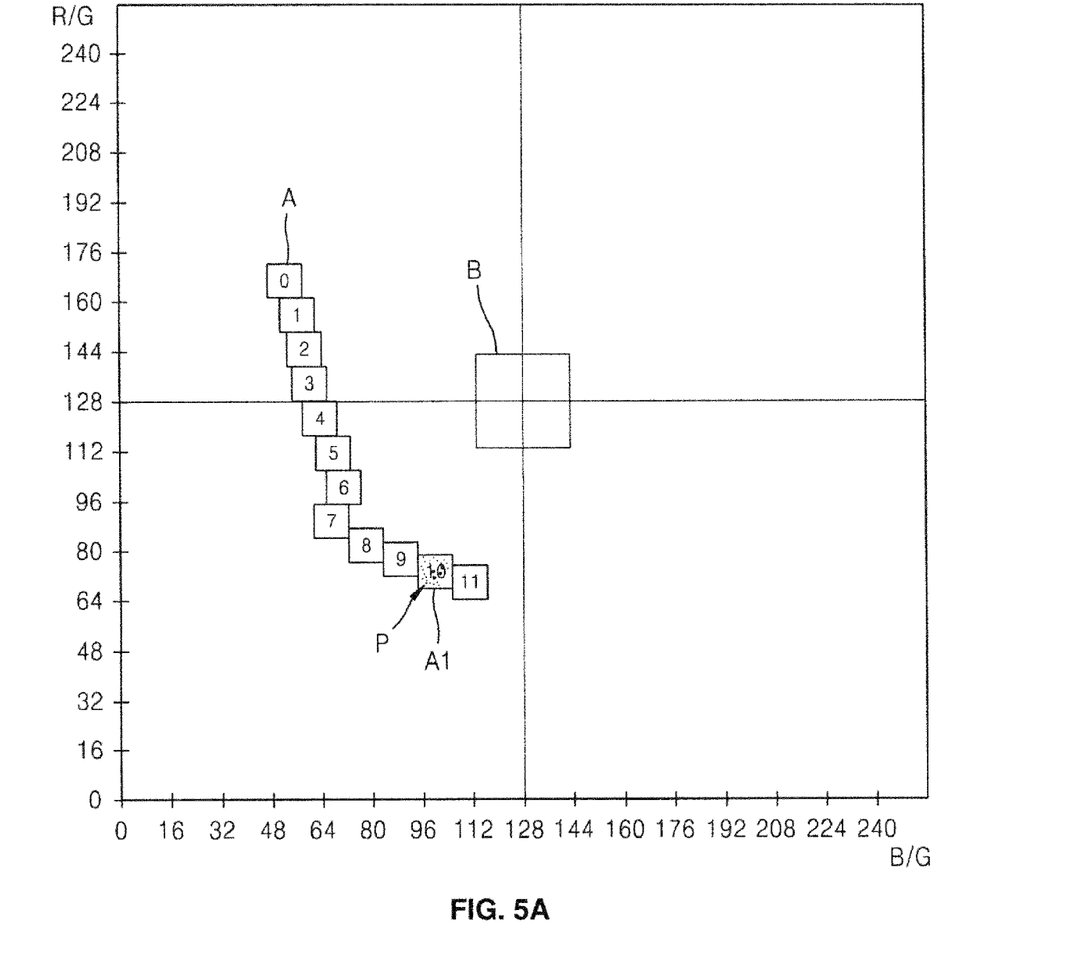
FIG. 5A is a graph for showing optical coordinates indicating color points of a case where AWB is not adjusted, according to an embodiment of the present disclosure.
Figure 5B:
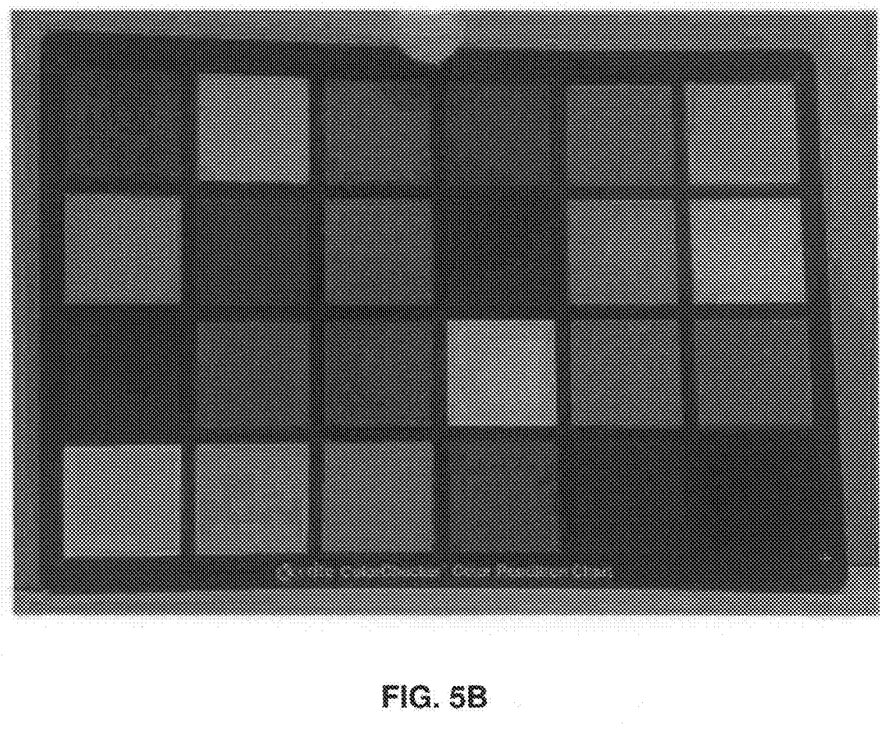
FIG. 5B is an image for showing a color rendition chart corresponding to the color points of FIG. 5A, according to an embodiment of the present disclosure.

FIG. 5A is a graph for showing optical coordinates indicating color points of an example where AWB is not adjusted, according to an embodiment of the present disclosure. FIG. 5B is an image for showing a color rendition chart corresponding to the color points of FIG. 5A, according to an embodiment of the present disclosure.

FIG. 5A shows an example where a light-source box 10 'A1' is the maximum light-source box having the greatest number of white pixels from among eleven light-source boxes 'A', which is obtained by the map setting unit 110 and the pixel counting unit 120. The reference letter 'P' indicates color points containing white pixels existing in the light-source box 10 'A1'.

FIG. 5B is an image for showing the color rendition chart of an example where the maximum number of white pixels exist in the light-source box 10 'A1' of FIG. 5A. An overall displayed color is close to a blue color.

Figure 6A:
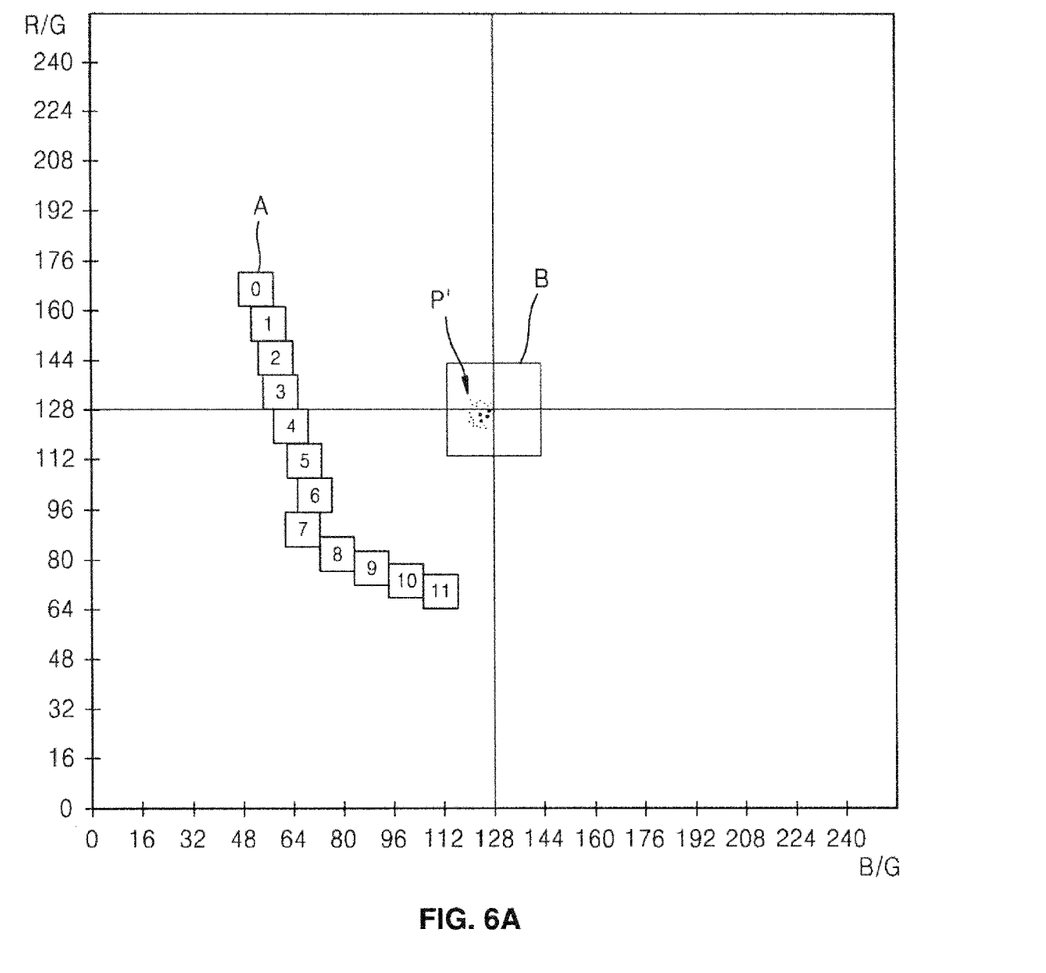
FIG. 6A is a graph for showing optical coordinates indicating color points of a case where AWB is adjusted, according to another embodiment of the present disclosure.
Figure 6B:
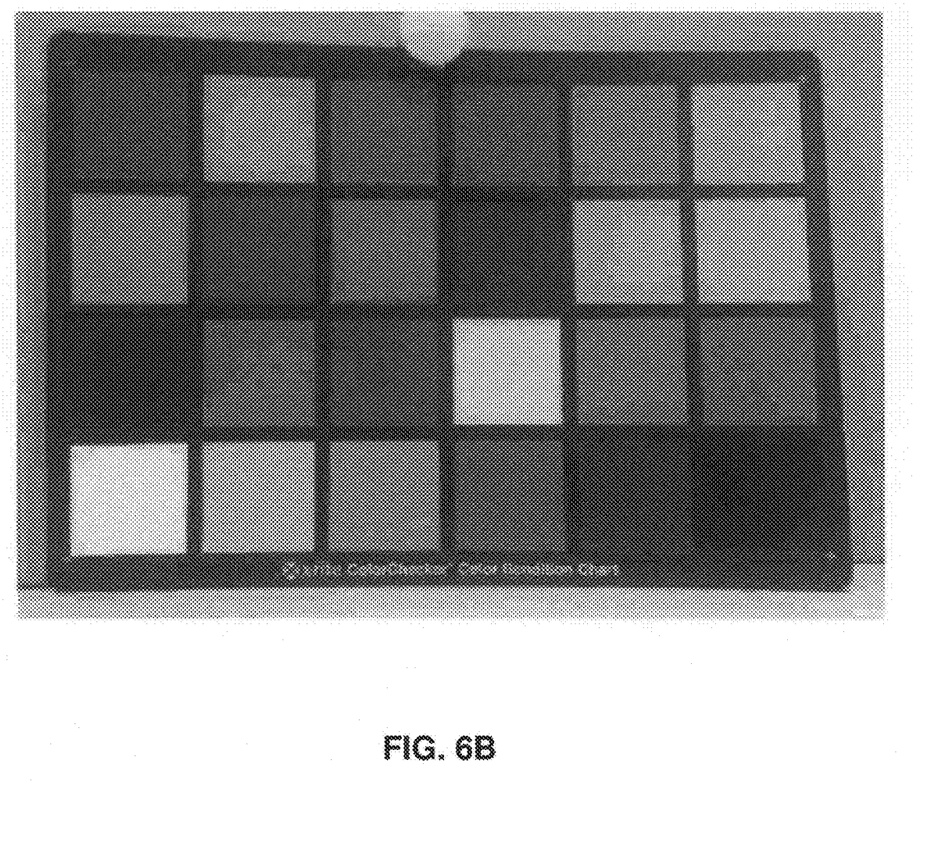
FIG. 6B is an image for showing a color rendition chart corresponding to the color points of FIG. 6A, according to another embodiment of the present disclosure.

FIG. 6A is a graph for showing optical coordinates indicating color points of an example where AWB is adjusted, according to another embodiment of the present disclosure. FIG. 6B is an image for showing a color rendition chart corresponding to the color points of FIG. 6A, according to another embodiment of the present disclosure.

Referring to FIG. 6A, red and blue gains are calculated according to Equation (2) so as to adjust the AWB, and then color points 'P" containing white pixels are moved to a central box 'B'. FIG. 6B shows an image for showing the color rendition chart after AWB is adjusted. As shown in FIGS. 6A and 6B, an overall displayed color is clearer than the example of FIG. 5B.

Figure 7:
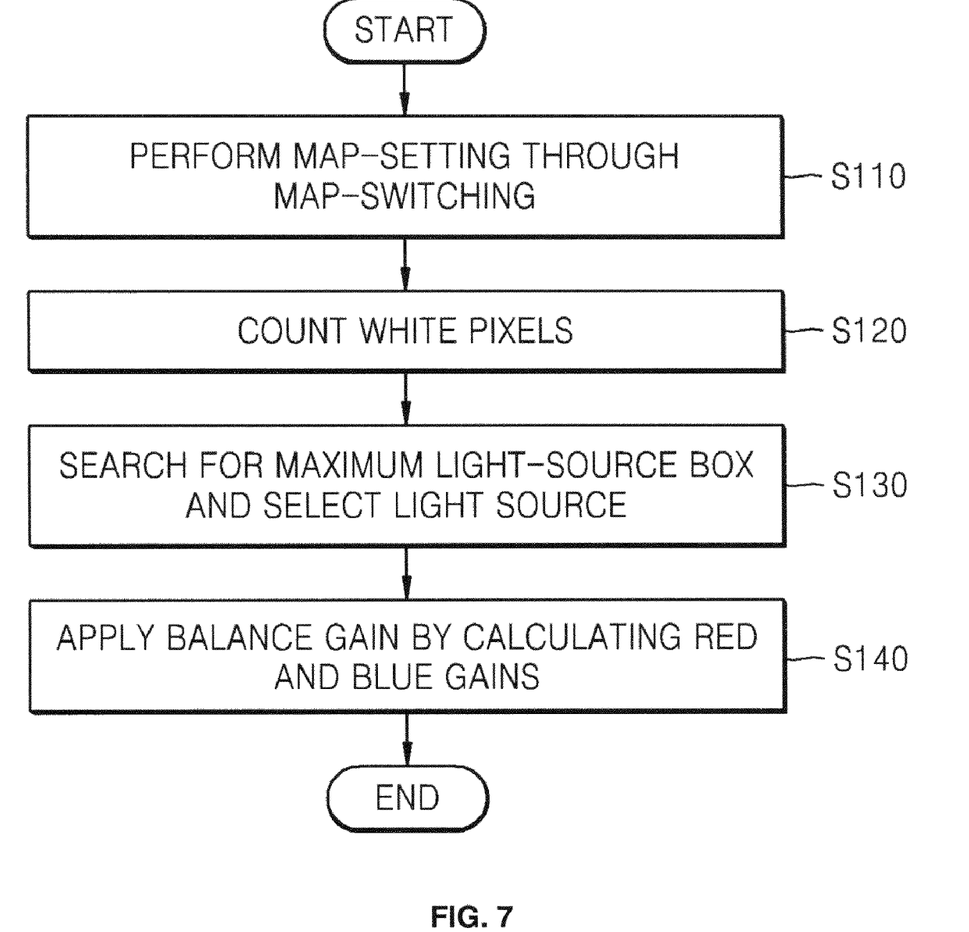
FIG. 7 is a flowchart of a method of adjusting AWB, according to an embodiment of the present disclosure.

FIG. 7 is a flowchart of an exemplary method of adjusting AWB, according to an embodiment of the present disclosure. For illustrative purposes only, the method is described with reference to devices described in FIG. 2A.

Referring to FIG. 7, in the method according to the present embodiment, the map setting unit 110 performs map-setting on a number of light-source boxes (e.g., sixteen) that is at least twice the number of a registers by performing map-switching (Operation S110). The map-setting operation that uses map-switching is described above with reference to FIG. 4. The pixel counting unit 120 counts the number of white pixels contained in each set light-source box (Operation S120). The light-source selection unit 130 selects a given light source, based on a maximum light-source box having the greatest number of white pixels (Operation S130). When the maximum light-source box is identified, the balance gain applying unit 140 calculates red and blue gains, based on a mapping value of the maximum light-source box, according to Equation (2) so as to adjust AWB (Operation S140).

Figure 8A:
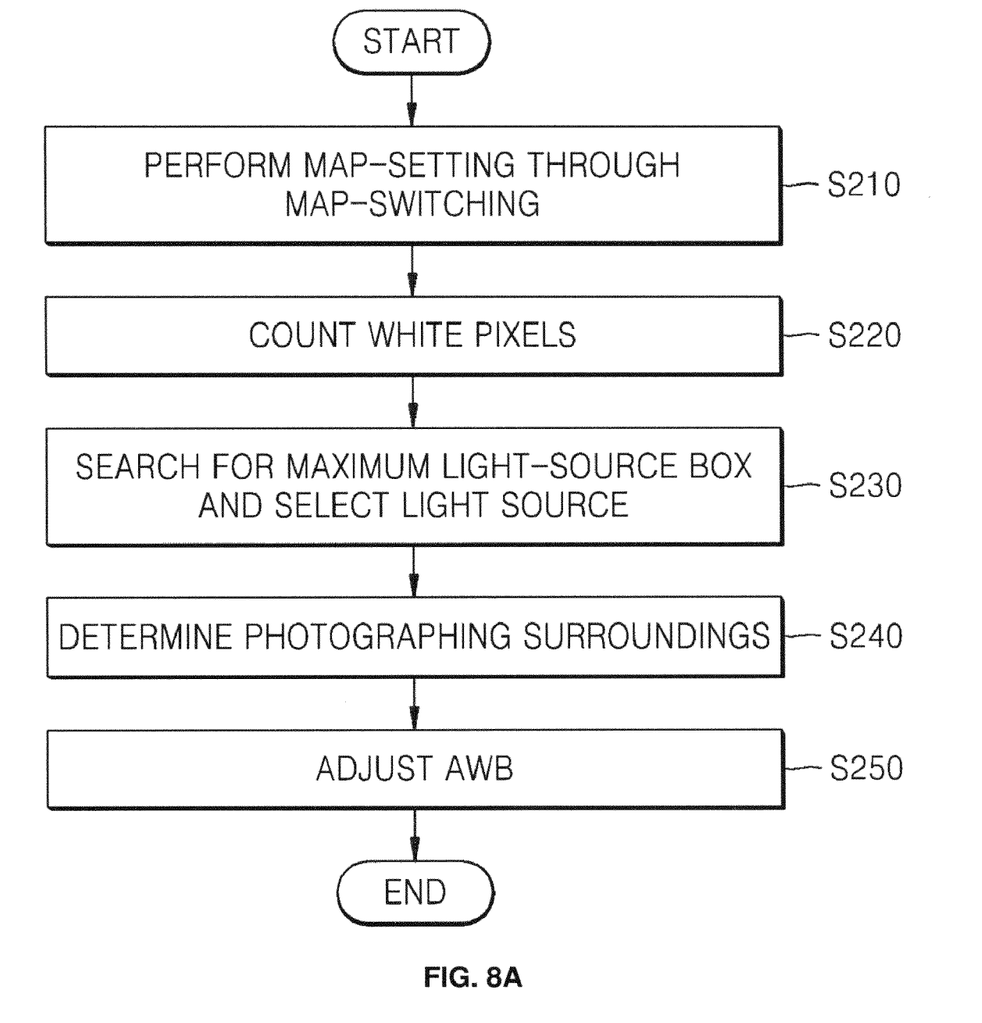
FIG. 8A is a flowchart of a method of adjusting AWB, according to anther embodiment of the present disclosure.

FIG. 8A is a flowchart of an exemplary method of adjusting AWB, according to anther embodiment of the present disclosure. For illustrative purposes only, the method is described with reference to the devices described in FIG. 2B.

The method according to the present embodiment has the same initial operations as those of the method shown in FIG. 7. For example, map-setting is performed (Operation S210), the number of white pixels contained in each set light-source box is counted (Operation S220), and a given light source is selected based on the maximum light-source box (Operation S230). In addition, the types of the surroundings or environments being imaged (e.g., indoors or outdoors) are determined by the defensive code unit 150 (Operation S240). The determining of the types of the surroundings by the defensive code unit 150 is described with reference to FIG. 2B above. The AWB adjusting unit 160 adjusts the AWB according to the determined types of the surroundings (Operation S250). The determining of the types of the surroundings (Operation S240) and adjusting of the AWB (Operation S250) are described further with reference to FIG. 8B.

Figure 8B:
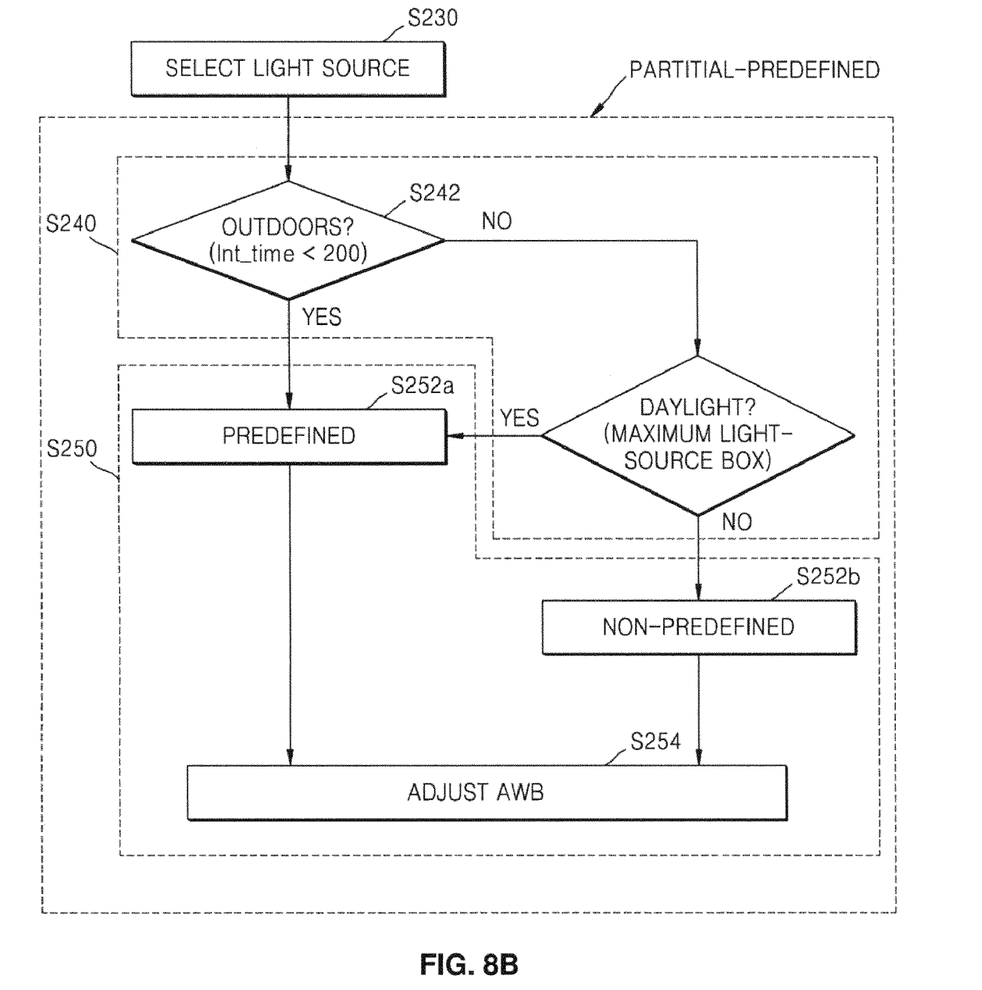
FIG. 8B is a flowchart for showing the determining of photographing surroundings and adjusting of AWB of FIG. 8A, according to an embodiment of the present disclosure.

FIG. 8B is a flowchart for showing an exemplary process for determining the types of the surroundings (Operation S240) and adjusting the AWB (Operation S250) of FIG. 8A, according to an embodiment of the present disclosure. The given light source is selected (Operation S230), and then the defensive code unit 150 determines whether the given location is indoors or outdoors (Operation S242). As described above with reference to FIG. 2B, the defensive code unit 150 can determine whether the given location is indoors or outdoors by comparing an AE time, that is, a shutter time interval (int_time), with a predetermined threshold value. For example, a threshold value can be set as a period of time corresponding to 200 Hsync lines. In this example, when the AE time is shorter than 200 Hsync lines, the defensive code unit 150 determines that the given location is outdoors. In addition, when the AE time is longer than or equal to 200 Hsync lines, the defensive code unit 150 determines that the given location is indoors.

When the defensive code unit 150 determines that the given location or surrounding is outdoors, red and blue gains are adjusted using the predefined method described above (Operation S252a). When the defensive code unit 150 determines that the given location or surrounding is indoors, the defensive code unit 150 also determines whether a light source is daylight (Operation S244). To determine whether the light source is daylight, the defensive code unit 150 determines whether the maximum light-source box selected in the light-source selection unit 130 is a light-source box located at the lowermost portion of a color coordinates system. When the defensive code unit 150 determines that the light source is daylight, red and blue gains are adjusted by the predefined method again (Operation S252a). Otherwise, when the defensive code unit 150 determines that the light source is not daylight, red and blue gains are calculated using the non-predefined method, that is, according to Equation (2) (Operation S252b). After the red and blue gains are calculated according to the photographing surroundings, the red and blue gains are applied to a corresponding frame so as to adjust AWB (Operation S254).

As shown in FIG. 8B, the method of adjusting the AWB may use the partial-predefined method in which the predefined method and the non-predefined method are selectively used based on the surroundings, through the defensive code unit 150. As described above, although the given location may in reality be indoors, the defensive code unit 150 may determine that the indoor location is outdoors. For example, a location adjacent to a window through which a large amount of sunlight enters the indoor location can be identified as outdoors, and the predefined method may be used. On the other hand, although a given location may be outdoors, the defensive code unit 150 may identify the outdoor location as indoors. For example, a location where the brightness is insufficient or an insufficient amount of sunlight is present may be determined to be an indoor location and the non-predefined method may be used.

According the described techniques, systems and apparatus for adjusting AWB, because a maximum of sixteen light-source boxes are used, by performing map-switching, a deviation between the light sources may be reduced so as to prevent an unstable color change of an image. Thus, the described techniques, systems and apparatus can improve the quality of the image sensor 1100.

Moreover, using the described techniques, systems and apparatus, light-source boxes that are as small as possible can be arranged as closely together as possible. Such a tight arrangement of light-source boxes can allow the optical color to be placed at a portion of a display where a light-source box exists, thereby realizing accurate colors.

In addition, because the defensive code unit 150 is used, this can avoid misdetection of light sources under a multi-light source environment, such as a location with both daylight and indoor-light. Thus, an adaptable AWB may be performed by maximizing the balance color sense with respect to the surroundings, and by applying a gain to the color sensor according to the user and inventor's preference.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An auto white balance (AWB) adjusting device comprising:
    a map setting unit to perform map-setting on a number of light-source boxes that is at least M times greater than a number of registers by performing map-switching, wherein M is an integer greater than or equal to 2;
    a pixel counting unit to count a number of white pixels in a standard image contained in each light-source box with map-setting;
    a light-source selection unit to select a light source based on a maximum light-source box selected from the number of light-source boxes having a greatest number of the white pixels; and
    a balance gain applying unit to calculate a red gain and a blue gain based on a mapping value of the maximum light-source box so as to adjust the AWB.

2. The AWB adjusting device of claim 1, wherein the map setting unit divides and sets information regarding eight of the light-source boxes with respect to each of an $(n-1)^{th}$ frame and an $n^{th}$ frame by using eight of the registers,
    wherein the pixel counting unit counts the number of the white pixels contained in each of the light-source boxes by using a temporary memory, and
    wherein the balance gain applying unit applies to an $(n+1)^{th}$ frame the red gain and the blue gain which are calculated based on the mapping value of the maximum light-source box.

3. The AWB adjusting device of claim 1, wherein the map setting unit performs map-setting by sequentially arranging the light-source boxes according to a test light-source when a light booth is filled with a gray chart.

4. The AWB adjusting device of claim 3, wherein only lens shading is performed on the standard image;
    wherein the test light-source comprises light sources corresponding to at least one of Horizon, A, TL84, CWF, Fluorescent, or Daylight, each having a color temperature defined in the light booth; and
    wherein the light-source boxes are arranged so as not to generate a space between the different light sources of the test light sources on a color coordinates system.

5. The AWB adjusting device of claim 1, wherein the balance gain applying unit calculates the red gain and the blue gain by multiplying a red color value and a blue color value of the standard image based on the mapping value of the maximum light-source box.

6. The AWB adjusting device of claim 5, wherein the balance gain applying unit is configured to:
    calculate the red gain by obtaining a R/G value calculated by dividing a sum of red color values of the maximum light-source box by a sum of green color values of the maximum light-source box and multiplying a value, obtained by dividing an intermediate value of color spaces by the R/G value, by a 10 bit value 1024; and
    calculate the blue gain by obtaining a B/G value calculated by dividing a sum of blue color values of the maximum light-source box by a sum of green color values of the maximum light-source box and multiplying a value, obtained by dividing an intermediate value of color spaces by the B/G value, by a 10 bit value 1024.

7. The AWB adjusting device of claim 1, further comprising a defensive code unit to correct mis-detection of the light source by the light-source selection unit.

8. The AWB adjusting device of claim 7, wherein the defensive code unit is configured to
   determine whether a given location is indoors or outdoors by comparing an auto exposure (AE) time with a predetermined threshold value;
   when determining that the given location is outdoors, adjust the AWB by using a predefined method of adjusting the red gain or the blue gain within a corresponding AWB range, and
   when determining that the given location is indoors, determine whether the light source is daylight;
      when determining that the light source is daylight, adjust the AWB using the predefined method; and
      when determining that the light-source is not daylight, adjust the AWB by adjusting the red gain and the blue gain using a non-predefined method through the balance gain applying unit.

9. An image processing apparatus comprising:
   an image sensor to output an analog image signal of a subject;
   an image signal processor to generate a video image signal as an output comprising:
      digitize the analog image signal,
      perform map-setting on a number of light-source boxes that is at least M times greater than a number of registers by performing map-switching, wherein M is an integer greater than or equal to 2,
      select a light source based on a maximum light-source box selected from the number of light-source boxes having a greatest number of white pixels, and
      calculate a red gain and a blue gain based on a mapping value of the maximum light-source box so as to adjust the AWB;
   an output unit to receive the video image signal from the image signal processor and output the received video image signal to a display device; and
   a controller to control the image sensor, the image signal processor, and the output unit.

10. The image processing apparatus of claim 9, wherein the image signal processor comprises an auto white balance (AWB) adjusting device to adjust the AWB, wherein the AWB adjusting device comprises:
   a map setting unit to divide and set information regarding the light-source boxes with respect to an $(n-1)^{th}$ frame and an $n^{th}$ frame by using the registers;
   a pixel counting unit to count the number of the white pixels contained in the light-source boxes by using a temporary memory;
   a light-source selection unit to select a light source based on the maximum light-source box, and
   a balance gain applying unit to apply to an $(n+1)^{th}$ frame the red gain and the blue gain which are calculated based on the mapping value of the maximum light-source box.

11. The image processing apparatus of claim 9, wherein the image signal processor is configured to calculate the red gain and the blue gain by multiplying a red color value and a blue color value of a standard image by the mapping value of the maximum light-source box.

12. The image processing apparatus of claim 9, wherein the image signal processor comprises an AWB adjusting device to adjust the AWB, wherein the AWB adjusting device comprises:
   a defensive code unit to
      selectively use a method of adjusting the red gain or the blue gain within a corresponding AWB range obtained by determining whether the given location is indoors or outdoors by comparing an auto exposure (AE) time with a predetermined threshold value, and
      selectively use a method of adjusting the red gain and the blue gain, through the balance gain applying unit, in order to correct mis-detection of the selected light source.

13. A method of adjusting auto white balance (AWB) performed by a data processing device, the method comprising:
   performing, at the data processing device, map-setting on a number of light-source boxes that is at least M times greater than a number of registers by performing map-switching, wherein M is an integer greater than or equal to 2;
   counting, at the data processing device, a number of white pixels in a standard image contained in each light-source box with map-setting performed;
   selecting, at the data processing device, a light source based on a maximum light-source box selected from the number of light-source boxes having a greatest number of the white pixels; and
   applying, at the data processing device, a balance gain by calculating a red gain and a blue gain based on a mapping value of the maximum light-source box so as to adjust the AWB.

14. The method of claim 13, wherein the performing of the map-setting comprises:
   dividing and setting information regarding eight of the light-source boxes with respect to an $(n-1)^{th}$ frame and an $n^{th}$ frame by using eight of the registers;
   counting the number of the white pixels contained in the light-source boxes by using a temporary memory; and
   applying to an $(n+1)^{th}$ frame the red gain and the blue gain which are calculated based on the mapping value of the maximum light-source box.

15. The method of claim 13, wherein the performing of the map-setting comprises:
   sequentially arranging the maximum of sixteen light-source boxes according to a test light-source when a light booth is filled with a gray chart; and
   wherein the maximum sixteen light-source boxes are sequentially arranged according to the test light-source comprising at least one of Horizon, A, TL84, CWF, Fluorescent, or Daylight, each having a color temperature defined in the light booth.

16. The method of claim 13, wherein the applying of the balance gain comprises:
   calculating the red gain and the blue gain by multiplying a red color value and a blue color value of the standard image by the mapping value of the maximum light-source box.

17. The method of claim 16, wherein calculating the red gain comprises obtaining a R/G value calculated by
   dividing a sum of red color values of the maximum light-source box by a sum of green color values of the maximum light-source box, and
   multiplying a value, obtained by dividing an intermediate value of color spaces by the R/G value, by a 10 bit value 1024; and
   wherein calculating the blue gain comprises obtaining a B/G value calculated by
   dividing a sum of blue color values of the maximum light-source box by a sum of green color values of the maximum light-source box, and multiplying a value, obtained by dividing an intermediate value of color spaces by the B/G value, by a 10 bit value 1024.

18. The method of claim 13, further comprising, prior to the applying of the balance gain, determining whether a given location is outdoors or indoors to correct mis-detection of the light source.

19. The method of claim 18, wherein the determining comprises:
 determining whether the given location is outdoors or indoors by comparing an auto exposure (AE) time with a predetermined threshold value; and
 determining whether the light source is Daylight when the given location is determined to be indoors.

20. The method of claim 19, wherein the applying of the balance gain comprises:
 when the given location is determined to be outdoors or the light source is determined to be Daylight, adjusting the AWB by adjusting the red gain or the blue gain within a corresponding AWB range; and
 when the given location is determined to be indoors and the light source is determined to not be Daylight, adjusting the AWB by calculating the red gain and the blue gain based on a mapping value of the maximum light-source box.

* * * * *